United States Patent
Lee et al.

(10) Patent No.: US 9,652,422 B2
(45) Date of Patent: May 16, 2017

(54) MULTI-BUS SYSTEM

(71) Applicant: SAMSUNG ELECTRONICS CO., LTD., Suwon-si, Gyeonggi-do (KR)

(72) Inventors: Yong Je Lee, Suwon-si (KR); Deum-Ji Woo, Yongin-si (KR); Young-Jun Kwon, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 528 days.

(21) Appl. No.: 14/160,957

(22) Filed: Jan. 22, 2014

(65) Prior Publication Data

US 2014/0215116 A1    Jul. 31, 2014

(30) Foreign Application Priority Data

Jan. 25, 2013  (KR) ................. 10-2013-0008716

(51) Int. Cl.
G06F 13/24    (2006.01)
G06F 13/37    (2006.01)

(52) U.S. Cl.
CPC .................... *G06F 13/37* (2013.01)

(58) Field of Classification Search
None
See application file for complete search history.

(56) References Cited

U.S. PATENT DOCUMENTS

| | | | | |
|---|---|---|---|---|
| 5,297,292 A | * | 3/1994 | Morimoto | G06F 13/36 370/462 |
| 5,682,467 A | * | 10/1997 | Ambalavanar | G06F 13/364 358/1.15 |
| 7,174,403 B2 | | 2/2007 | Ganasan | |
| 7,305,510 B2 | | 12/2007 | Miller | |
| 7,380,045 B2 | * | 5/2008 | Park | G06F 13/1605 710/315 |
| 7,508,981 B2 | | 3/2009 | Park | |
| 7,554,355 B2 | | 6/2009 | Chang et al. | |
| 2005/0289268 A1 | * | 12/2005 | Miller | G06F 13/4054 710/110 |
| 2008/0065796 A1 | * | 3/2008 | Lee | G06F 12/1416 710/71 |
| 2008/0244131 A1 | | 10/2008 | Vergnes et al. | |
| 2012/0137039 A1 | | 5/2012 | Murata | |
| 2014/0223049 A1 | * | 8/2014 | Balkan | G06F 13/4027 710/106 |

FOREIGN PATENT DOCUMENTS

| | | |
|---|---|---|
| JP | 2002-318782 | 10/2002 |
| KR | 1020050090849 | 9/2005 |
| KR | 1020060118875 | 11/2006 |
| KR | 1020100118312 | 11/2010 |
| KR | 1020100137326 | 12/2010 |

* cited by examiner

*Primary Examiner* — Elias Mamo
(74) *Attorney, Agent, or Firm* — F. Chau & Associates, LLC

(57) ABSTRACT

A multi-bus system includes a first layer bus, a second layer bus connected to the first layer bus, at least one master device, and a decoder. The at least one master device is configured to be connected to the first layer bus via a first data path, and configured to be connected to the second layer bus via a second data path. The decoder is configured to directly connect the at least one master device to the first layer bus via the first data path, and directly connect the at least one master device to the second layer bus via the second data path.

10 Claims, 10 Drawing Sheets

MULTI-BUS SYSTEM

CROSS-REFERENCE TO RELATED APPLICATIONS

This application claims priority under 35 U.S.C. §119 to Korean Patent Application No. 10-2013-0008716, filed on Jan. 25, 2013 the disclosure of which is incorporated by reference herein in its entirety.

TECHNICAL FIELD

Exemplary embodiments of the present invention relate to a multi-bus system.

DISCUSSION OF THE RELATED ART

As the size of a system-on-chip (SoC) increases, intellectual property (IP) blocks using various protocols have been integrated into one chip. In addition, the existence of various application programs using the SoC has resulted in a bus structure changing from a static structure to a dynamic structure.

In a conventional bus structure, one master device may be fixed and connected to one bus. Accordingly, the arbitration of data transfer between master devices is performed only between master devices connected to one bus. In this case, in a multi-bus system, even if a master device connected to a bus of a lower layer is assigned with a high priority by an arbiter of the bus of the lower layer, the master device is also subject to arbitration of an arbiter of a bus of an upper layer, which may result in the master device having a disadvantage in terms of priority.

SUMMARY

Exemplary embodiments of the present invention provide a multi-bus system in which one master device may be connected to two or more buses, and in which a decoder connects the master device to any one of the buses.

According to an exemplary embodiment of the present invention, a multi-bus system includes a first layer bus, a second layer bus disposed lower than the first layer bus and connected to the first layer bus, at least one master device having a data path connected to each of the first layer bus and the second layer bus, and a decoder connecting the at least one master device to any one of the first layer bus and the second layer bus.

According to an exemplary embodiment of the present invention, a multi-bus system includes a first layer bus, a second layer bus disposed lower than the first layer bus and connected to the first layer bus, at least one master device connectable to any one of the first layer bus and the second layer bus, a decoder connecting the at least one master device to any one of the first layer bus and the second layer bus, and a bus bridge placed between the second layer bus and the decoder and converting a data protocol.

According to an exemplary embodiment of the present invention, a multi-bus system includes a first layer bus, a second layer bus connected to the first layer bus, at least one master device configured to be connected to the first layer bus via a first data path, and configured to be connected to the second layer bus via a second data path, and a decoder configured to directly connect the at least one master device to the first layer bus via the first data path, and directly connect the at least one master device to the second layer bus via the second data path.

According to an exemplary embodiment of the present invention, a multi-bus system includes a first layer bus, a second layer bus connected to the first layer bus, at least one master device configured to be connected to one of the first layer bus and the second layer bus, a decoder configured to connect the at least one master device to one of the first layer bus and the second layer bus, and a bus bridge disposed between the second layer bus and the decoder, and configured to convert data of a first data protocol to data of a second data protocol, wherein the first data protocol is different from the second data protocol.

According to an exemplary embodiment of the present invention, a multi-bus system includes a first layer bus, a second layer bus connected to the first layer bus, at least one master device configured to be connected to the first layer bus and the second layer bus, and a decoder configured to directly connect the at least one master device to the first layer bus, and directly connect the at least one master device to the second layer bus, and connect the at least one master device to the first layer bus via the second layer bus.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
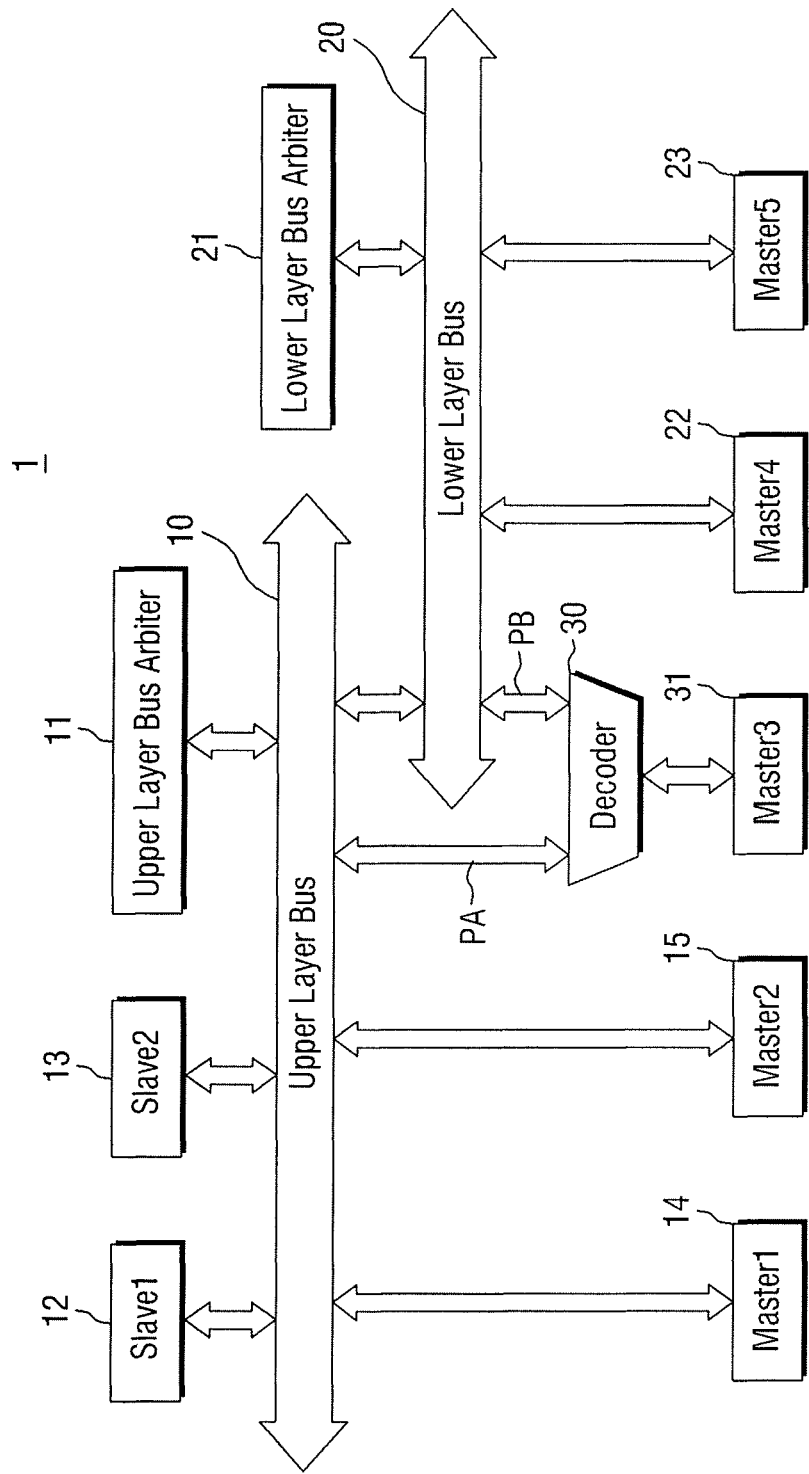
FIG. 1 is a diagram illustrating a multi-bus system, according to an exemplary embodiment of the present invention.

Exemplary embodiments of the present invention will be described more fully hereinafter with reference to the accompanying drawings. Like reference numerals may refer to like elements throughout the accompanying drawings.

It will also be understood that when a layer is referred to as being "on" another layer or substrate, it can be directly on the other layer or substrate, or intervening layers may also be present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

While terms "first," "second" and "third" are used to describe various components and parts, the components and parts are not limited to the terms "first," "second" and "third." The terms "first," "second" and "third" are used only to distinguish between each of the components and parts. Thus, a first component or part may indicate a second or third component or part.

FIG. 1 is a diagram illustrating a multi-bus system 1, according to an exemplary embodiment of the present invention.

Referring to FIG. 1, the multi-bus system 1 may be an expanded bus system that includes multiple layers of buses connected to each other. For example, in FIG. 1, the multi-bus system 1 includes an upper layer bus 10 and a lower layer bus 20 connected to the upper layer bus 10. Although FIG. 1 illustrates two layers of buses, exemplary embodiments are not limited thereto. For example, exemplary embodiments may include three or more layers of buses. Herein, when a component such as, for example, a master device or a slave device is connected to a layer bus and is actively communicating with the layer bus, the component may be referred to as being operatively coupled to the layer bus.

A data protocol of the upper layer bus 10 may be a first protocol, and a data protocol of the lower layer bus 20 may be a second protocol. For example, the upper layer bus 10 and the lower layer bus 20 may be operated according to a protocol such as, for example, Wishbone, advanced high-performance bus (AHB), advanced peripheral bus (APB), advanced system bus (ASB), advanced microcontroller bus architecture (AMBA), Aurora, CoreConnect bus, open core protocol (OCP), STBus, STNoC, or element interconnect bus (EIB). However, the protocols are not limited thereto. Further, multiple layers of buses of the multi-bus system 1 may include the same protocols, different protocols, or a combination of the same and different protocols.

For convenience of explanation, when referring to the multi-bus system 1 of FIG. 1, it is assumed that the first protocol and the second protocol are the same. Accordingly, a bus bridge, which will be described in further detail below, may not be provided. However, as described above, the first and second protocols may be different, and in these exemplary embodiments, a bus bridge may be included.

A first master device 14, a second master device 15, a first slave device 12 and a second slave device 13 are connected in parallel to the upper layer bus 10. Each of the first and second master devices 14 and 15 may transmit or receive data (or commands) to/from the other master device 14 or 15 or the first and second slave devices 12 and 13 via the upper layer bus 10. The first and second master devices 14 and 15 may sequentially occupy and use the upper layer bus 10 in order of their priority.

In an exemplary embodiment, each of the first and second master devices 14 and 15 may be, for example, a processor unit, a digital signal processor, or a direct memory access (DMA) controller, and each of the first and second slave devices 12 and 13 may be a memory that processes data received from the first and second master devices 14 and 15, such as, for example, a random access memory (RAM), a read only memory (ROM), a synchronous dynamic RAM (SDRAM) or a rambus DRAM (RDRAM), may be an input/output (I/O) device such as, for example, a universal serial bus (USB) or a universal asynchronous receiver transmitter (UART), or may be, for example, a peripheral device.

An upper layer bus arbiter 11 is connected to the upper layer bus 10. The upper layer bus arbiter 11 manages priorities of master devices connected to the upper layer bus 10.

In an exemplary embodiment, the upper layer bus arbiter 11 may receive a bus use request (e.g., a REQ signal) from master devices. To allow the master devices to use the upper layer bus 10, the upper layer bus arbiter 11 may prioritize the master devices and grant authority (e.g., via a GNT signal) to use the upper layer bus 10 to any one of the master devices.

In an exemplary embodiment, the upper layer bus arbiter 11 may assign fixed priorities to the master devices according to fixed priority scheduling. Alternatively, the upper layer bus arbiter 11 may assign time-based flexible priorities to the master devices according to, for example, round-robin priority scheduling. In this case, the upper layer bus arbiter 11 may monitor the frequency of use of the upper layer bus 10 by each master device, and assign priorities to the master devices based on the monitoring result. Alternatively, the upper layer bus arbiter 11 may manage the priorities of the master devices based on quality of service (QoS) standards. Alternatively, the upper layer bus arbiter 11 may manage the priorities of the master devices according to an embedded control program.

The arbitration of the upper layer bus arbiter 11 may be performed when power is supplied to the multi-bus system 1, or at another time as necessary. The upper layer bus arbiter 11 may arbitrate only between master devices that have sent the bus use request, between all master devices, or between different combinations of master devices, including some master devices that have sent the bus use request and some master devices that have not sent the bus use request.

A fourth master device 22 and a fifth master device 23 are connected in parallel to the lower layer bus 20. Each of the fourth and fifth master devices 22 and 23 may transmit or receive data (or commands) to/from the other master device 22 or 23 using the lower layer bus 20. The fourth and fifth master devices 22 and 23 may sequentially occupy and use the lower layer bus 20 in order of their priority.

In an exemplary embodiment, each of the fourth and fifth master devices 22 and 23 may be, for example, a processor unit, a digital signal processor, or a DMA controller.

A lower layer bus arbiter 21 is connected to the lower layer bus 20. The lower layer bus arbiter 21 manages priorities of master devices connected to the lower layer bus 20. In an exemplary embodiment, the lower layer bus arbiter 21 may prioritize the connected master devices in the same manner, or in substantially the same manner as the upper layer bus arbiter 11 described above, and may grant authority to use the lower layer bus 20 to any one of the connected master devices.

In the multi-bus system 1 of FIG. 1, the upper layer bus 10 and the lower layer bus 20 are connected to each other. Therefore, each of the master devices 14, 15, 22 and 23 connected to one of the upper layer bus 10 and the lower layer bus 20 can transmit or receive data (or commands) to/from master devices or slave devices connected to the other layer bus 10 or 20 to which it is not directly connected using the other layer bus 10 or 20. In this case, each of the master devices 14, 15, 22 and 23 may be assigned with a priority by the bus arbiter 11 or 21 of the other layer bus 10 or 20 that the master device intends to use, and may occupy and use the other layer bus 10 or 20 according to its priority.

A third master device 31 is configured to be connected in parallel to the upper layer bus 10 and the lower layer bus 20. The third master device 31 may be connected directly to the upper layer bus 10 via a data path PA, and may be connected to the lower layer bus 20 via a data path PB. Accordingly, the third master device 31 may be connected directly to the upper layer bus 10 or may be connected to the upper layer bus 10 via the lower layer bus 20.

To transmit or receive data using the upper layer bus 10, the third master device 31, similar to master devices 14 and 15, may occupy and use the upper layer bus 10 according to its priority. Therefore, the third master device 31 is assigned with a priority and given authority to use the upper layer bus 10 by the upper layer bus arbiter 11. In addition, to transmit or receive data using the lower layer bus 20, the third master device 31, similar to master devices 22 and 23, may occupy and use the lower layer bus 20 according to its priority. Therefore, the third master device 31 is also assigned with a priority and given authority to use the lower layer bus 20 by the lower layer bus arbiter 21.

In an exemplary embodiment, the third master device 31 may be, for example, a processor unit, a digital signal processor, or a DMA controller.

A decoder 30 may be placed on a data path between each of the upper layer bus 10 and the lower layer bus 20 and the third master device 31. For example, in FIG. 1, one decoder 30 is placed on the data path PA between the upper layer bus 10 and the third master device 31, and on the data path PB between the lower layer bus 20 and the third master device 31. However, exemplary embodiments of the present invention are not limited thereto, and multiple decoders may be utilized. The decoder 30 may connect the third master device 31 to any one of the upper layer bus 10 and the lower layer bus 20. The decoder 30 may be, for example, a 2×1 decoder, however the decoder 30 is not limited thereto.

The multi-bus system 1 of FIG. 1 may further include additional components other than the components described above. In an exemplary embodiment, one or more slave devices may be connected to the lower layer bus 20 of the multi-bus system 1. In addition, the number of master devices and/or slave devices of the multi-bus system 1 may be increased or reduced in different implementations.

Figure 2:
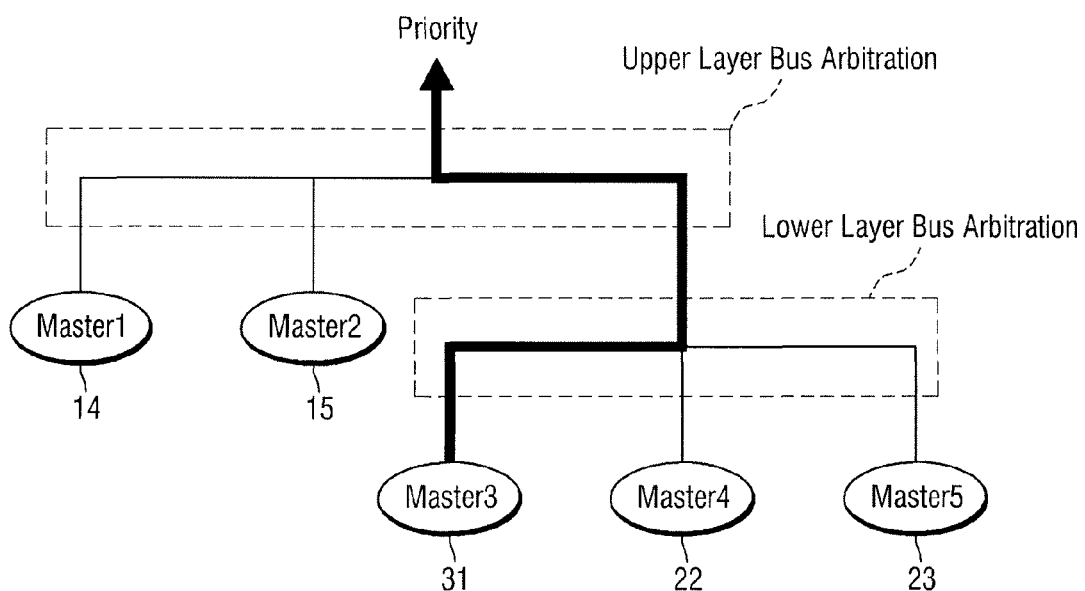
FIGS. 2 and 3 are diagrams illustrating a process in which the multi-bus system of FIG. 1 changes an arbitration method, according to exemplary embodiments of the present invention.
Figure 3:
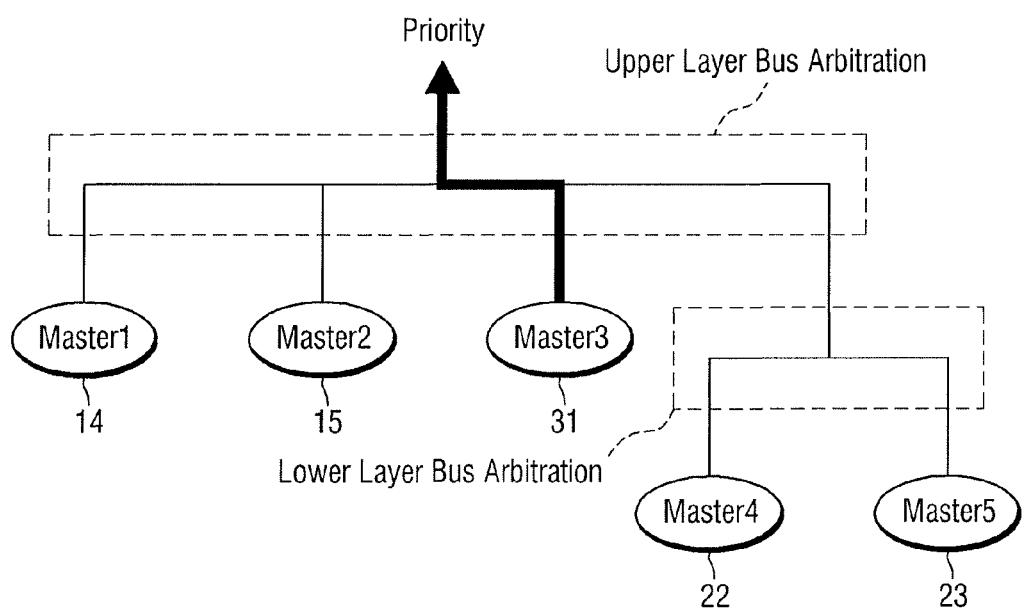

A process in which the multi-bus system 1 of FIG. 1 dynamically changes a method of arbitrating between master devices based on output selection of the decoder 30 is described herein. FIGS. 2 and 3 are diagrams illustrating a process in which the multi-bus system 1 of FIG. 1 changes an arbitration method. In FIGS. 2 and 3, a case in which the third master device 31 accesses any one slave device 12 or 13 connected to the upper layer bus 10 will be described as an example.

Referring to FIG. 2, in a first section, the decoder 30 connects the third master device 31 to the lower layer bus 20. In this case, to be given priority by the lower layer bus arbiter 21, the third master device 31 contends with other master devices 22 and 23 connected to the lower layer bus 20.

Even when the third master device 31 is assigned a high priority by the lower layer bus arbiter 21, the third master device 31 is also subject to the arbitration of the upper layer bus arbiter 11 in order to access the master devices 14 and 15 or the slave devices 12 and 13 connected to the upper layer bus 10. That is, to be given priority by the upper layer bus arbiter 11, the third master device 31 also contends with other master devices 14 and 15 connected to the upper layer bus 10. In this case, when the amount of data of the third master device 31 is relatively smaller than that of the other master devices, any potential disadvantage in terms of priority may be mitigated.

Referring to FIG. 3, in a second section, the decoder 30 connects the third master device 31 directly to the upper layer bus 10. In this case, the third master device 31 is only subject to the arbitration of the upper layer bus arbiter 11 in order to access the master devices 14 and 15 or the slave devices 12 and 13 connected to the upper layer bus 10. That is, to be given priority by the upper layer bus arbiter 11, the third master device 31 only contends with other master devices 14 and 15 connected to the upper layer bus 10. In this case, the third master device 31 is not subject to the arbitration of the lower layer bus arbiter 21. Accordingly, the third master device 31 can be assigned with a higher priority in the second section than in the first section without being at a disadvantage in terms of priority.

Therefore, a multi-bus system according to an exemplary embodiment of the present invention may distribute the respective amounts of data of master devices by selectively and relatively changing a method of arbitrating between the master devices (e.g., a method of determining priorities of the master devices). For example, if a master device has a large amount of data, it may be connected directly to a bus at a higher layer than a bus to which the master device is currently connected to, resulting in the master device being assigned with a high priority. In addition, if the amount of data of the master device is reduced, the master device may be connected to a bus at a lower layer than the bus to which the master device is currently connected to.

Figure 4:
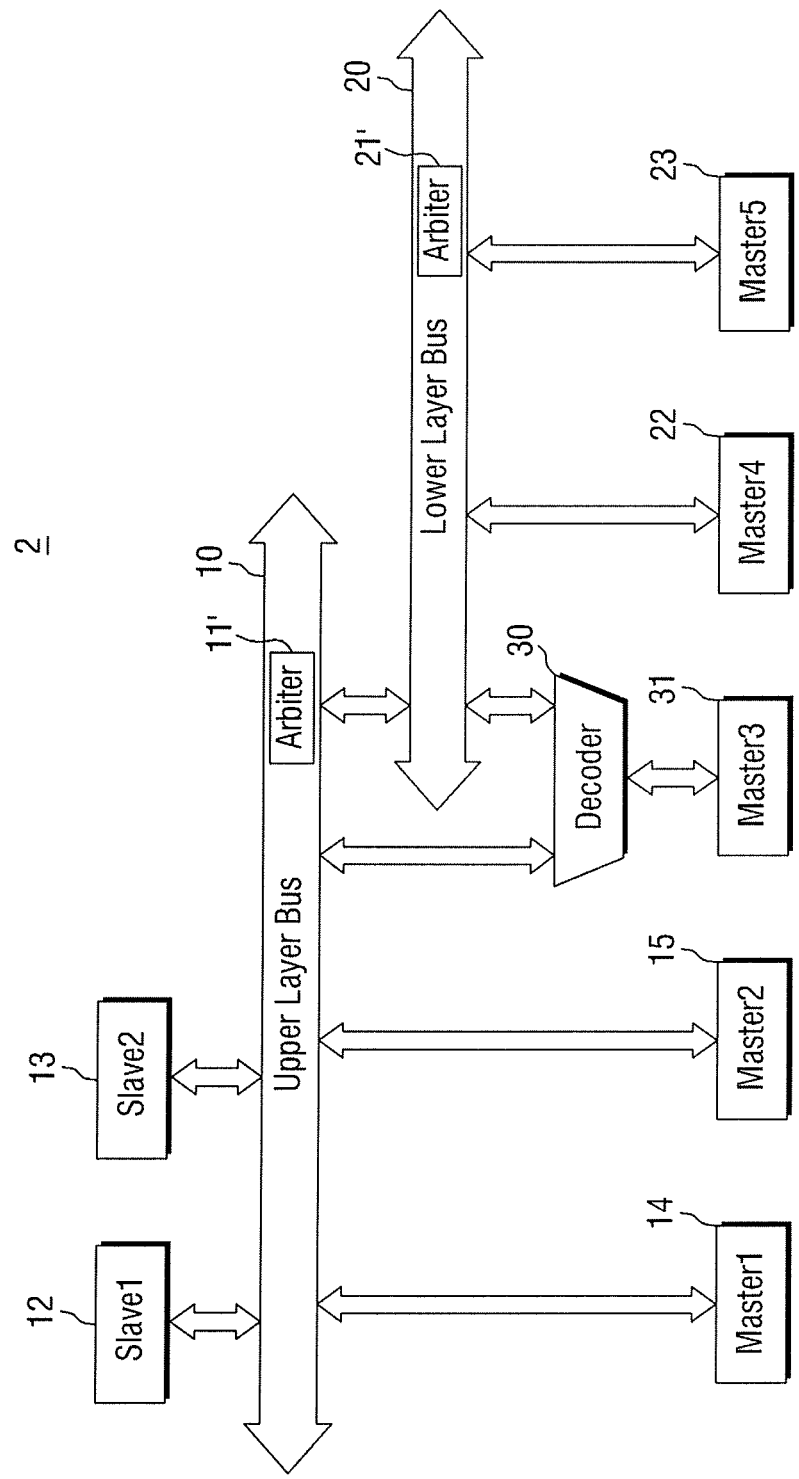
FIG. 4 is a diagram illustrating a multi-bus system, according to an exemplary embodiment of the present invention.

FIG. 4 is a diagram illustrating a multi-bus system 2 according to an exemplary embodiment of the present invention. For convenience of explanation, the following description may focus on differences relative to the exemplary embodiment shown in FIG. 1.

Referring to FIG. 4, the multi-bus system 2 may be an expanded bus system that includes multiple layers of buses connected to each other. For example, in FIG. 2, the multi-bus system 2 includes an upper layer bus 10 and a lower layer bus 20 connected to the upper layer bus 10.

In FIG. 2, the upper layer bus 10 and the lower layer bus 20 respectively include arbiters 11' and 21' disposed therein, rather than having arbiters disposed external to the buses. In an exemplary embodiment, each of the arbiters 11' and 21' may prioritize master devices in the same way, or substantially the same way as the upper layer bus arbiter 11 and the lower layer bus arbiter 21 described with reference to FIG. 1, and may grant authority to use the upper layer bus 10 or the lower layer bus 20 to any one of the master devices.

Figure 5:
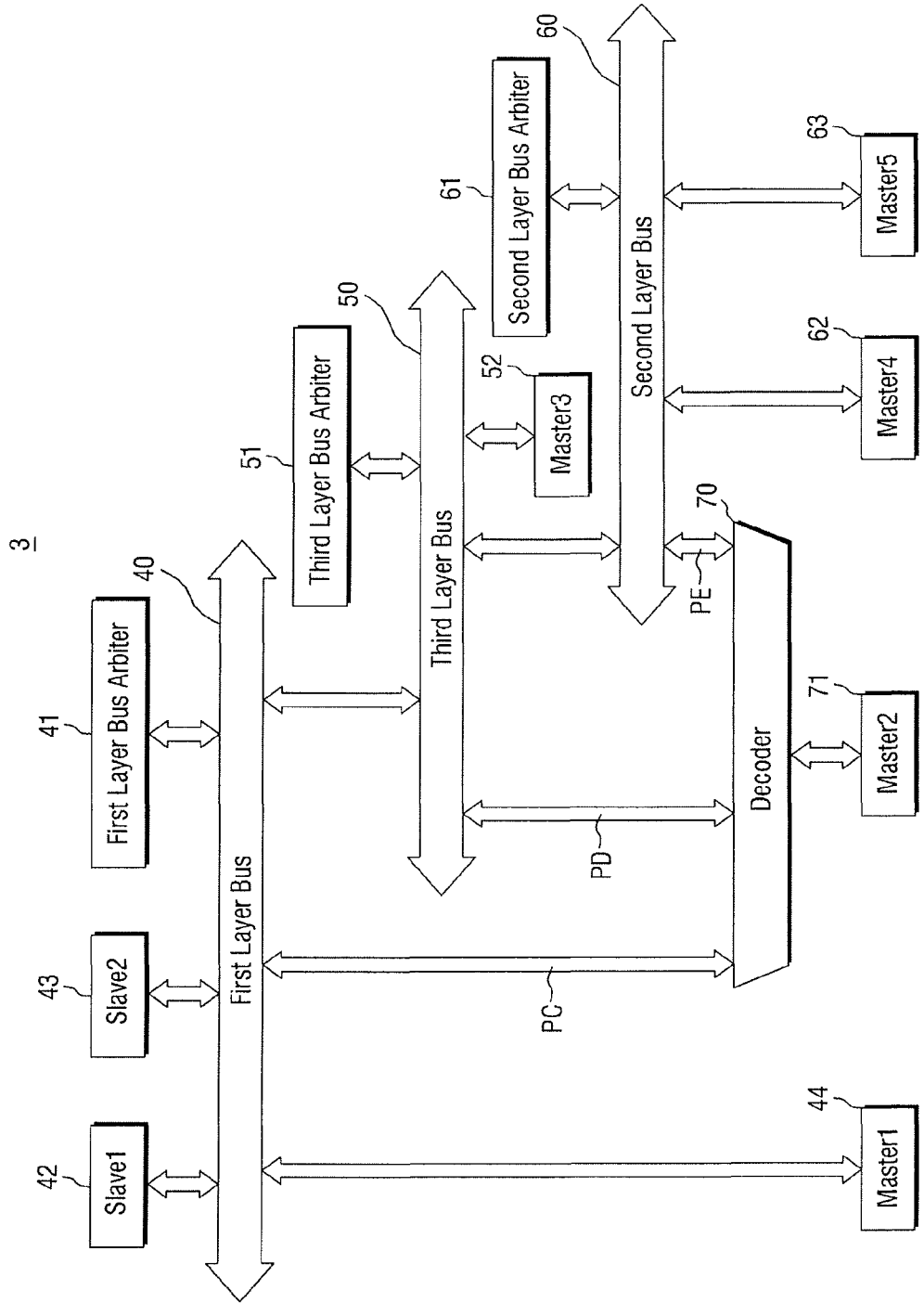
FIG. 5 is a diagram illustrating a multi-bus system, according to an exemplary embodiment of the present invention.

FIG. 5 is a diagram illustrating a multi-bus system 3, according to an exemplary embodiment of the present invention. For convenience of explanation, the following description may focus on differences relative to the exemplary embodiment of FIG. 1.

Referring to FIG. 5, the multi-bus system 3 may be an expanded bus system that includes three or more layers of buses connected to each other. For example, in FIG. 5, the multi-bus system 3 includes a first layer bus 40, a third layer bus 50 connected to the first layer bus 40, and a second layer bus 60 connected to the third layer bus 50.

In FIG. 5, the multi-bus system 3 includes the third layer bus 50 disposed between the first layer bus 40 and the second layer bus 60, and connected to the first layer bus 40 and the second layer bus 60.

A first master device 44, a first slave device 42 and a second slave device 43 are connected in parallel to the first layer bus 40. The first master device 44 may transmit or receive data (or commands) to/from the first and second slave devices 42 and 43 via the first layer bus 40. The first master device 44 may occupy and use the first layer bus 40 according to its priority.

A first layer bus arbiter 41 is connected to the first layer bus 40. The first layer bus arbiter 41 manages priorities of master devices connected to the first layer bus 40. In an exemplary embodiment, the first layer bus arbiter 41 may prioritize the master devices in the same way, or substantially the same way as the upper layer bus arbiter 11 described with reference to the exemplary embodiment of FIG. 1, and may grant authority to use the first layer bus 40 to any one of the master devices.

A third master device 52 is connected in parallel to the third layer bus 50. The third master device 52 may occupy and use the third layer bus 50 according to its priority.

A third layer bus arbiter 51 is connected to the third layer bus 50. The third layer bus arbiter 51 manages priorities of master devices connected to the third layer bus 50. In an exemplary embodiment, the third layer bus arbiter 51 may prioritize the master devices in the same way, or substantially the same way as the upper layer bus arbiter 11 described with reference to the exemplary embodiment of FIG. 1, and may grant authority to use the third layer bus 50 to any one of the master devices.

A fourth master device 62 and a fifth master device 63 are connected in parallel to the second layer bus 60. Each of the fourth and fifth master devices 62 and 63 may transmit or receive data (or commands) to/from the other master device 62 or 63 via the second layer bus 60. The fourth and fifth master devices 62 and 63 may sequentially occupy and use the second layer bus 60 in order of their priority.

A second layer bus arbiter 61 is connected to the second layer bus 60. The second layer bus arbiter 61 manages priorities of master devices connected to the second layer bus 60. In an exemplary embodiment, the second layer bus arbiter 61 may prioritize the devices in the same way, or substantially the same way as the upper layer bus arbiter 11 described with reference to the exemplary embodiment of FIG. 1, and may grant authority to use the second layer bus 60 to any one of the master devices.

In the multi-bus system 3 of FIG. 5, the first layer bus 40, the third layer bus 50, and the second layer bus 60 are connected to each other. Therefore, each of the master devices 44, 52, 62 and 63 can transmit or receive data (or commands) to/from other master devices or slave devices connected to the same layer bus, or to another layer bus 40, 50 or 60 to which it is not directly connected by using the layer bus 40, 50 or 60. In this case, each of the master devices 44, 52, 62 and 63 may be assigned with a priority by the bus arbiter 41, 51 or 61 of the layer bus 40, 50 or 60 that the master device intends to use, and may occupy and use the layer bus 40, 50 or 60 according to its priority.

A second master device 71 may be connected in parallel to the first layer bus 40, the third layer bus 50, and the second layer bus 60. The second master device 71 may be connected to the layer buses via a data path PC connected directly to the first layer bus 40, a data path PD connected directly to the third layer bus 50, and a data path PE connected directly to the second layer bus 60. Accordingly, the second master device 71 may be connected directly to the first layer bus 40, may be connected directly to the third layer bus 50, may be connected to the first layer bus 40 via the third layer bus 50, or may be connected to the first layer bus 40 via the third layer bus 50 and the second layer bus 60.

To transmit or receive data using the first layer bus 40 or the third layer bus 50, the second master device 71, similar to master devices 44 and 52, may occupy and use the first layer bus 40 or the third layer bus 50 according to its priority. Therefore, the second master device 71 is assigned with a priority and given authority to use the first layer bus 40 or the third layer bus 50 by the first layer bus arbiter 41 or the third layer bus arbiter 51. In addition, to transmit or receive data using the second layer bus 60, the second master device 71, similar to master devices 62 and 63, may occupy and use the second layer bus 60 according to its priority. Therefore, the second master device 71 is assigned with a priority and given authority to use the second layer bus 60 by the second layer bus arbiter 61.

A decoder 70 may be placed on a data path between each of the first layer bus 40, the third layer bus 50 and the second layer bus 60 and the second master device 71. For example, in FIG. 5, one decoder 70 is placed on the data path PC between the first layer bus 40 and the second master device 71, on the data path PD between the third layer bus 50 and the second master device 71, and on the data path PE between the second layer bus 60 and the second master device 71. However, exemplary embodiments of the present invention are not limited thereto, and multiple decoders may be utilized. The decoder 70 may connect the second master device 71 to any one of the first layer bus 40, the third layer bus 50 and the second layer bus 60. The decoder 70 may be, for example, a 3×1 decoder, however the decoder 70 is not limited thereto.

As described above with reference to FIGS. 2 and 3, the multi-bus system 3 of FIG. 5 may dynamically change a method of arbitrating between master devices according to output selection of the decoder 70.

In the multi-bus system 3 of FIG. 5, in a first section, the decoder 70 may connect the second master device 71 to the second layer bus 60, and the second master device 71 may be assigned with a priority by the second layer bus arbiter 61. To access the master device 44 or the slave devices 42 and 43 connected to the first layer bus 40, the second master device 71 may be subject to arbitration of the third layer bus arbiter 51 and the first layer bus arbiter 41.

In a second section, the decoder 70 may connect the second master device 71 directly to the third layer bus 50, and the second master device 71 may be assigned with a priority by the third layer bus arbiter 51. To access the master device 44 or the slave devices 42 and 43 connected to the first layer bus 40, the second master device 71 may be subject to arbitration of the first layer bus arbiter 41.

In a third section, the decoder 70 may connect the second master device 71 directly to the first layer bus 40. To access the master device 44 or the slave devices 42 and 43 connected to the first layer bus 40, the second master 71 may be subject only to arbitration of the first layer bus arbiter 41.

Figure 6:
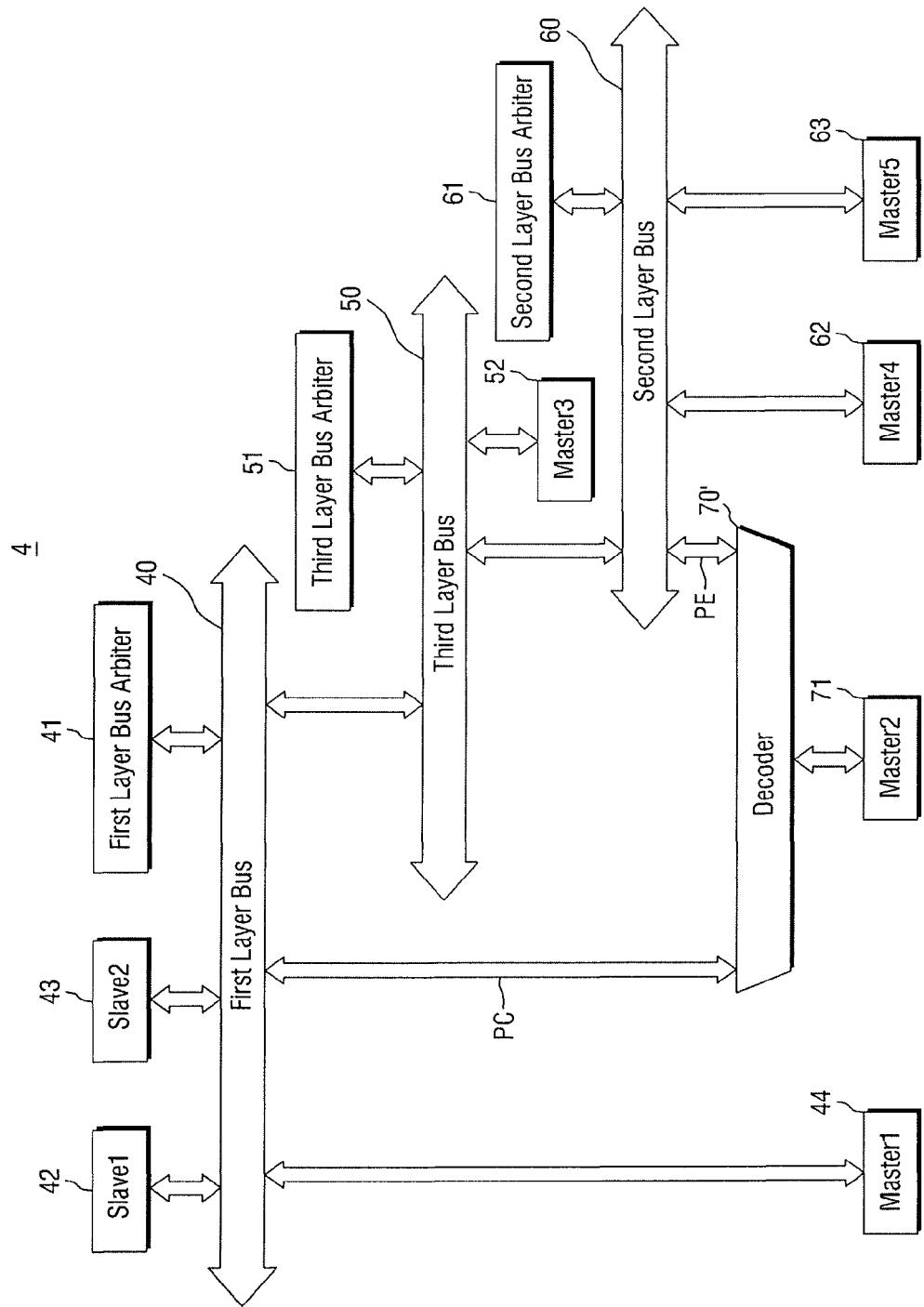
FIG. 6 is a diagram illustrating a multi-bus system, according to an exemplary embodiment of the present invention.

FIG. 6 is a diagram illustrating a multi-bus system 4, according to an exemplary embodiment of the present invention. For convenience of explanation, the following description may focus on differences relative to the exemplary embodiment of FIG. 5.

Referring to FIG. 6, the multi-bus system 4 may be an expanded bus system that includes multiple layers of buses connected to each other. For example, in FIG. 6, the multi-bus system 4 includes a first layer bus 40, a third layer bus 50 connected to the first layer bus 40, and a second layer bus 60 connected to the third layer bus 50.

In FIG. 6, the multi-bus system 4 includes a second master 71 device connected in parallel to the first layer bus 40 and the second layer bus 60. In FIG. 6, the second master device 71 is not directly connected to the third layer bus 50. The second master device 71 may be connected directly to the first layer bus 40 via a data path PC, and may be connected to the second layer bus 60 via a data path PE. In FIG. 6, the second master device 71 is not directly connected to the third layer bus 50 via a direct data path. Accordingly, the second master device 71 may be connected directly to the first layer bus 40 or may be connected to the first layer bus 40 via the third layer bus 50 and the second layer bus 60.

A decoder 70' may be placed on a data path between each of the first layer bus 40 and the second layer bus 60 and the second master device 71. The decoder 70' may connect the second master device 71 to any one of the first layer bus 40 and the second layer bus 60. The decoder 70' may be, for example, a 2×1 decoder, however the decoder 70' is not limited thereto.

In the multi-bus systems 3 and 4 of FIGS. 5 and 6, only the third layer bus 50 is connected between the first layer bus 40 and the second layer bus 60. However, exemplary embodiments of the present invention are not limited thereto. For example, two or more layers of buses may be connected between the first layer bus 40 and the second layer bus 60. In this case, the second master device 71 may or may not be connected to at least one of the layers of buses.

Figure 7:
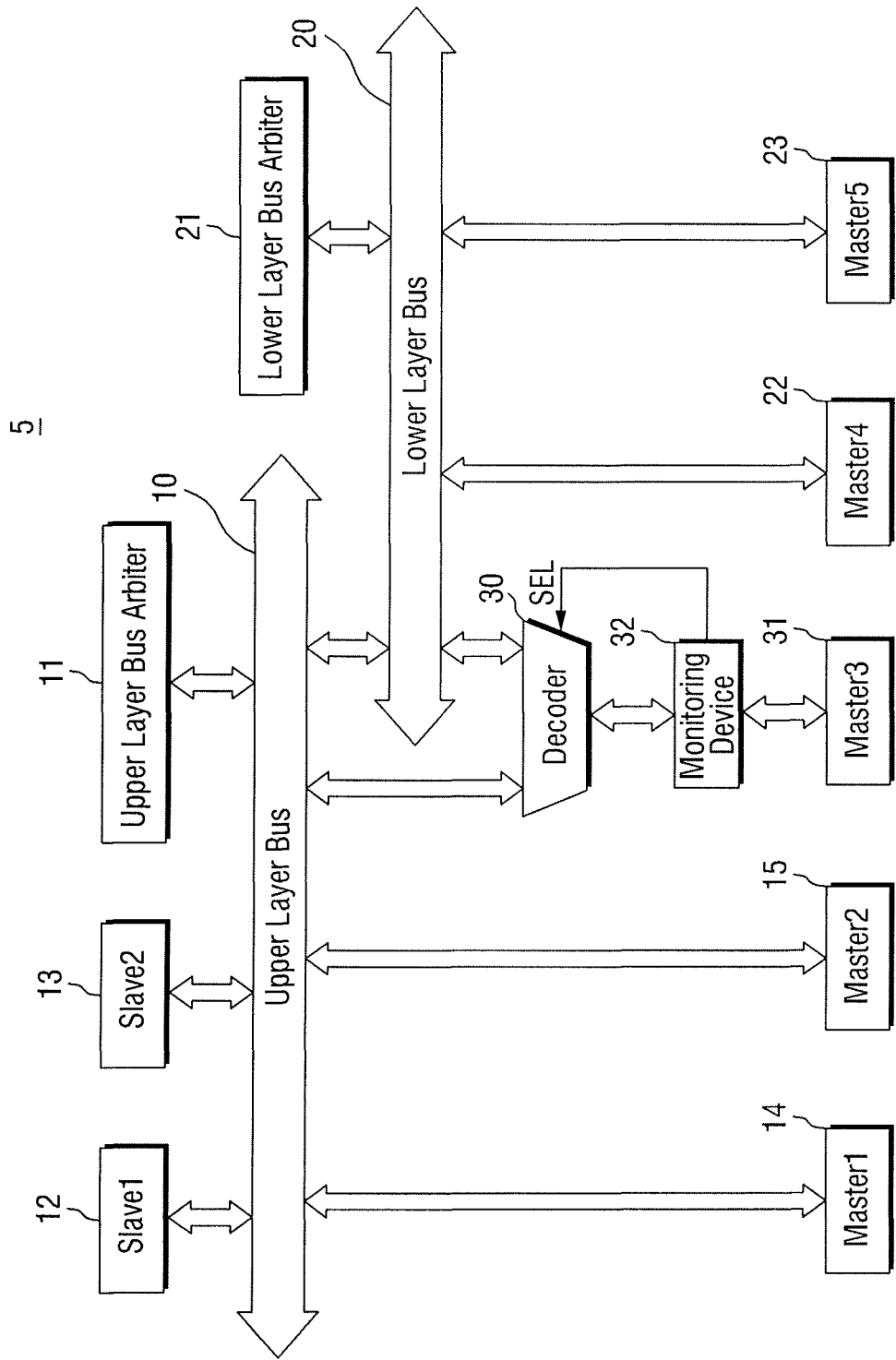
FIG. 7 is a diagram illustrating a multi-bus system, according to an exemplary embodiment of the present invention.

FIG. 7 is a diagram illustrating a multi-bus system 5, according to an exemplary embodiment of the present invention. For convenience of explanation, the following description may focus on differences relative to the exemplary embodiment of FIG. 1.

Referring to FIG. 7, the multi-bus system 5 may be an expanded bus system that includes multiple layers of buses connected to each other. For example, in FIG. 7, the multi-bus system 5 includes an upper layer bus 10 and a lower layer bus 20 connected to the upper layer bus 10.

In FIG. 7, a monitoring device 32 is placed on a data path between a decoder 30 and a third master device 31. However, exemplary embodiments of the present invention are not limited thereto. An additional monitoring device may also be placed on a data path between the upper layer bus 10 and the decoder 30, and/or on a data path between the lower layer bus 20 and the decoder 30.

The monitoring device 32 is configured to monitor the state of the multi-bus system 5. For example, the monitoring device 32 may measure the amount of use of the third master device 31. Alternatively, the monitoring device 32 may measure the respective amounts of use of first through third master devices 14, 15 and 31, or the respective amounts of use of third through fifth master devices 31, 22 and 23. The monitoring device 32 may transmit a selection signal SEL to the decoder 30 based on the result of monitoring the state of the multi-bus system 5 (e.g., the result of measuring the amount(s) of use of master device(s)).

The decoder 30 may select any one of the upper layer bus 10 and the lower layer bus 20 according to the selection signal SEL, and connect the third master device 31 to the bus 10 or 20 selected according to the selection signal SEL. In an exemplary embodiment, when receiving the selection signal SEL having a first level (e.g., "0"), the decoder 30 may connect the third master device 31 to the lower layer bus 20. When receiving the selection signal SEL having a second level (e.g., "1"), the decoder 30 may connect the third master device 31 directly to the upper layer bus 10.

Figure 8:
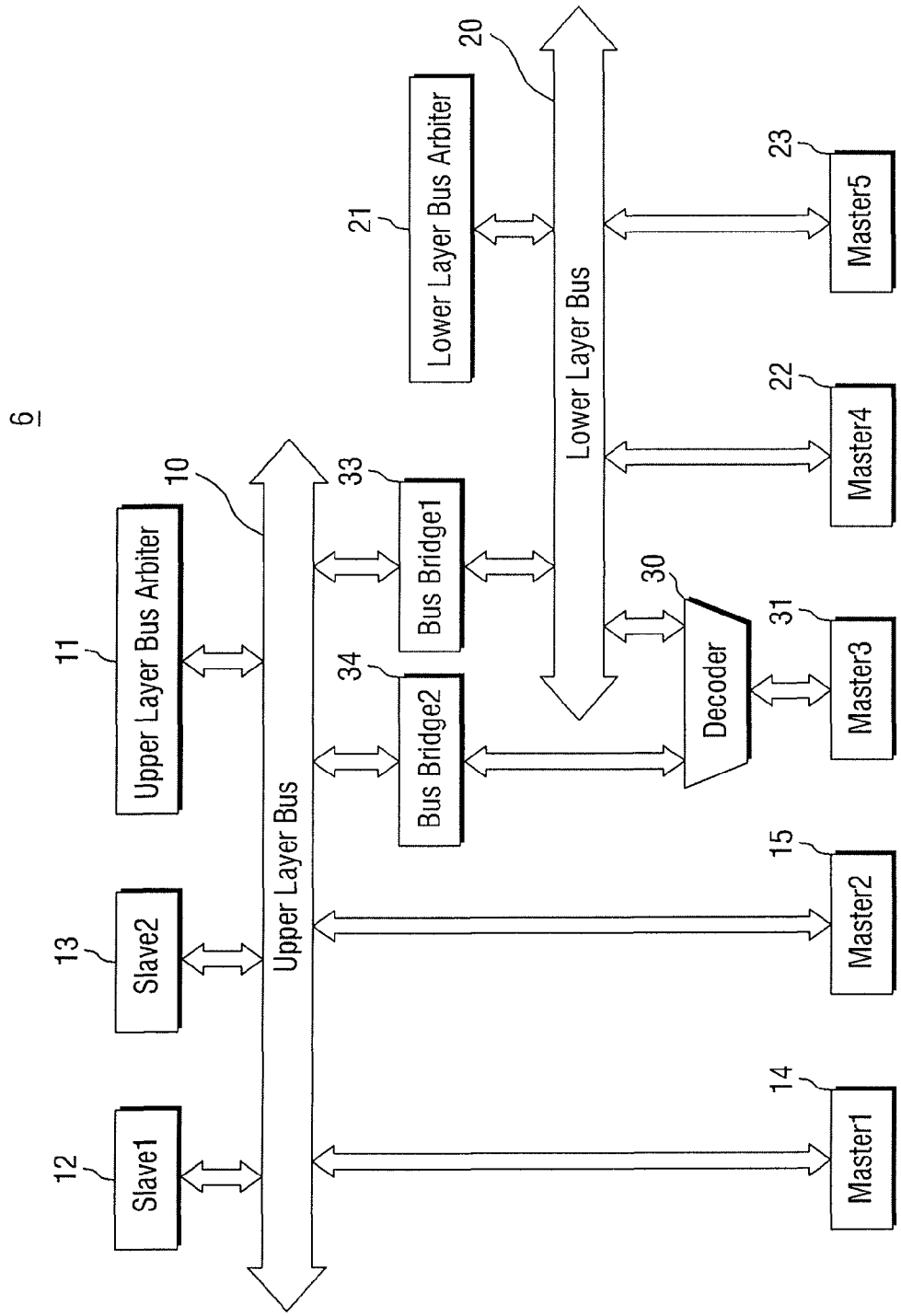
FIG. 8 is a diagram illustrating a multi-bus system, according to an exemplary embodiment of the present invention.

FIG. 8 is a diagram illustrating a multi-bus system 6, according to an exemplary embodiment of the present invention. For convenience of explanation, the following description may focus on differences relative to the exemplary embodiment of FIG. 1.

Referring to FIG. 8, the multi-bus system 6 may be an expanded bus system that includes multiple layers of buses connected to each other. For example, in FIG. 8, the multi-bus system 6 includes an upper layer bus 10 and a lower layer bus 20 connected to the upper layer bus 10.

A data protocol of the upper layer bus 10 may be a first protocol, and a data protocol of the lower layer bus 20 may be a second protocol. For example, the upper layer bus 10 and the lower layer bus 20 may be operated according to a protocol such as, for example, Wishbone, AHB, APB, ASB, AMBA, Aurora, CoreConnect bus, OCP, STBus, STNoC, or EIB. However, the protocols are not limited thereto. Further, multiple layers of buses of the multi-bus system 6 may include the same protocols, different protocols, or a combination of the same and different protocols.

For convenience of explanation, when referring to FIG. 8 herein, it is assumed that the first protocol and the second protocol are different protocols.

A first bus bridge 33 may be placed on a data path between the upper layer bus 10 and the lower layer bus 20, and a second bus bridge 34 may be placed on a data path between the upper layer bus 10 and a decoder 30. However, exemplary embodiments of the present invention are not limited thereto. For example, exemplary embodiments may include only a single bus bridge placed on the data path between the upper layer bus 10 and the lower layer bus 20, on the data path between the upper layer bus 10 and the decoder 30 or on a data path between the lower layer bus 20 and the decoder 30. Exemplary embodiments may further include a plurality of bus bridges disposed at some or all of these locations.

The first bus bridge 33 interfaces the upper layer bus 10 with the lower layer bus 20. The first bus bridge 33 serves as an interface that transfers data between a master device or a slave device connected to the upper layer bus 10 and a master device (or in exemplary embodiments, a slave device) connected to the lower layer bus 20.

The first bus bridge 33 is configured to convert data of the first protocol to data of the second protocol, or data of the second protocol to data of the first protocol. Using the first bus bridge 33, each master device connected to one of the upper layer bus 10 and the lower layer bus 20 may transmit data of a different protocol (e.g., a protocol of the other bus 10 or 20) to a master device or a slave device connected to the other bus 10 or 20.

The second bus bridge 34 interfaces the upper layer bus 10 with the decoder 30. The second bus bridge 34 serves as an interface that transfers data between master devices 14 and 15 or slave devices 12 and 13 connected to the upper layer bus 10 and the decoder 30.

The second bus bridge 34 is configured to convert data of the first protocol to data of the second protocol, or data of the second protocol to data of the first protocol. When a third master device 31 is connected directly to the upper layer bus 10 via the decoder 30, the third master device 31 may transmit or receive to/from a master device or a slave device connected to the upper layer bus 10 data of a protocol different from a protocol of the upper layer bus 10 using the second bus bridge 34.

The multi-bus systems 3 and 4 of FIGS. 5 and 6 may further include components similar to, or substantially similar to the monitoring device 32 of FIG. 7 or the bus bridges 33 and 34 of FIG. 8.

In the multi-bus systems 3 through 6 of FIGS. 5 through 8, each layer bus may include an arbiter disposed therein, as opposed to an externally disposed arbiter, as described with reference to the exemplary embodiment of FIG. 4. In each of the multi-bus systems 1 through 6 according to exemplary embodiments of the present invention, some of the layer buses may include an arbiter disposed therein, and some of the layer buses may include an externally disposed arbiter.

The multi-bus systems 1 through 6 according to exemplary embodiments of the present invention may be implemented in, for example, a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a three-dimensional television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system. However, the multi-bus systems 1 through 6 are not limited thereto.

According to exemplary embodiments, a bus, an arbiter, a decoder, a monitoring device, and a bus bridge may be packaged using various forms of packages. For example, the bus, the arbiter, the decoder, the monitoring device, and the bus bridge may be packaged using a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), and wafer-level processed stack package (WSP). However, the type of packaging used for these components is not limited thereto.

Figure 9:
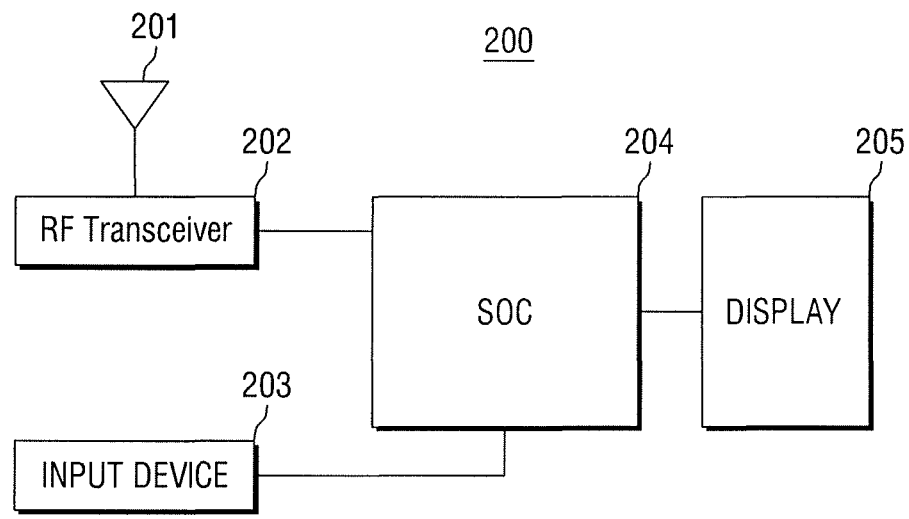
FIG. 9 is a diagram illustrating a semiconductor system including multi-bus systems according to exemplary embodiments of the present invention.

FIG. 9 is a diagram illustrating a semiconductor system 200 including multi-bus systems described herein, according to exemplary embodiments of the present invention.

Referring to FIG. 9, the semiconductor system 200 includes an antenna 201, a radio frequency (RF) transceiver 202, an input device 203, a system-on-chip (SoC) 204, and a display 205.

The RF transceiver 202 may transmit or receive a radio signal through the antenna 201. The RF transceiver 202 may convert a radio signal received through the antenna 201 into a signal that can be processed by the SoC 204. In addition, the RF transceiver 202 may convert a signal received from the SoC 204 to a radio signal, and transmit the radio signal to an external device through the antenna 201.

The SoC 204 may process a signal received from the RF transceiver 202 and transmit the processed signal to the display 205. The multi-bus systems 1 through 6 according to exemplary embodiments of the present invention may be provided as one of various components that constitute the SoC 204.

The input device 203 may be used to input commands for controlling the operation of the SoC 204 or data to be processed by the SoC 204. In an exemplary embodiment, the input device 204 may be implemented as, for example, a pointing device such as a touch pad or a computer mouse, a keypad, or a keyboard, however the input device 204 is not limited thereto.

The semiconductor system 200 of FIG. 9 may be, for example, a portable computer, a web tablet, a wireless phone, a mobile phone, a digital music player, or an electronic product capable of transmitting and/or receiving information in a wireless environment. However, the semiconductor device 200 is not limited thereto.

Figure 10:
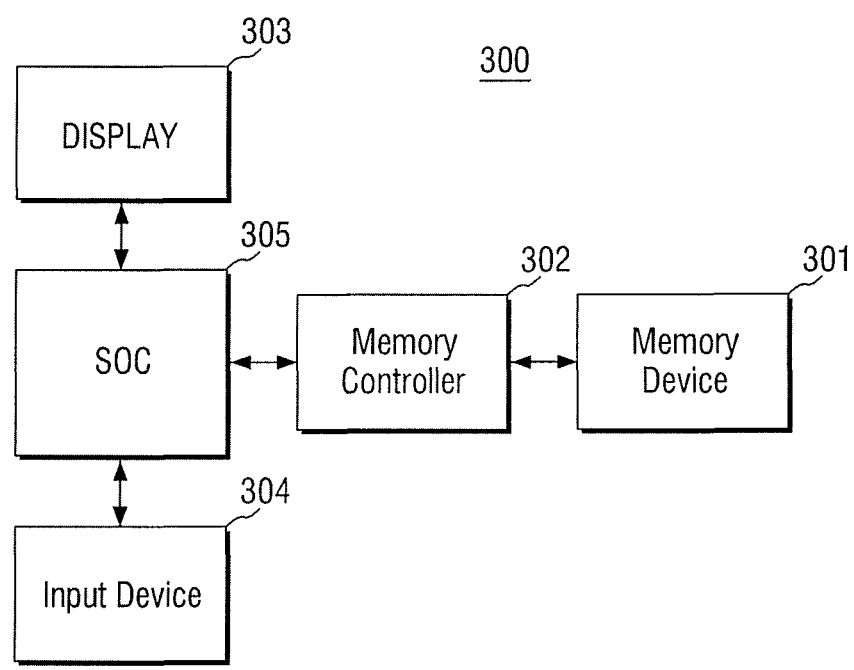
FIG. 10 is a diagram illustrating an example of a semiconductor system including multi-bus systems according to exemplary embodiments of the present invention.

FIG. 10 is a diagram illustrating an example of a semiconductor system including multi-bus systems described herein, according to exemplary embodiments of the present invention.

Referring to FIG. 10, a semiconductor 300 includes a memory device 301, a memory controller 302, a display 303, an input device 304, and a SoC 305.

The memory device 301 may include a plurality of memory cells which can store data.

The memory controller 302 may control a write operation, a read operation, an erase operation, etc., of the memory device 301.

The SoC 305 may write data to the memory device 301 through the memory controller 302, or transmit data stored in the memory device 301 to the display 303 according to a command or data input through the input device 304. The multi-bus systems 1 through 6 according to exemplary embodiments of the present invention may be provided as one of various components that constitute the SoC 305.

The input device 304 may be used to input commands for controlling the operation of the SoC 305 or data to be processed by the SoC 305. In an exemplary embodiment, the input device 304 may be implemented as, for example, a pointing device such as a touch pad or a computer mouse, a keypad, or a keyboard, however the input device 304 is not limited thereto.

The memory controller 302, which controls the operation of the memory device 301, may be disposed within the SoC 305 or may be provided as a separate chip external to the SoC 305.

The semiconductor system 300 of FIG. 10 may be, for example, a computer, a UMPC, a work station, a tablet, a net-book, an e-reader, a PDA, a PMP, or a digital music player. However, the semiconductor system 300 is not limited thereto.

Figure 11:
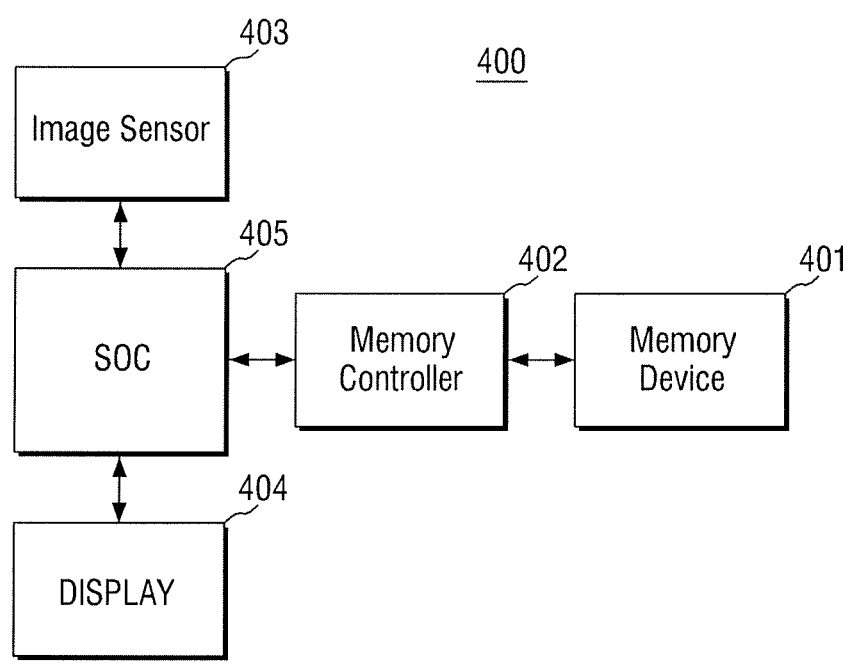
FIG. 11 is a diagram illustrating an example of a semiconductor system including multi-bus systems according to exemplary embodiments of the present invention.

FIG. 11 is a diagram illustrating an example of a semiconductor system including multi-bus systems according to exemplary embodiments of the present invention.

Referring to FIG. 11, a semiconductor system 400 includes a memory device 401, a memory controller 402, an image sensor 403, a display 404, and a SoC 405.

The memory device 401 may include a plurality of memory cells which can store data.

The memory controller 402 may control a write operation, a read operation, an erase operation, etc. of the memory device 401.

The image sensor 403 may convert an optical image to a digital signal, and transmit the digital signal to the SoC 405 or the memory controller 402.

The SoC 405 may transmit the digital signal to the display 404, or write the digital signal to the memory device 401 through the memory controller 402. The multi-bus systems 1 through 6 according to exemplary embodiments of the present invention may be provided as one of various components that constitute the SoC 405.

The memory controller 402, which controls the operation of the memory device 401, may be disposed within the SoC 405 or may be provided as a separate chip external to the SoC 405.

The semiconductor system 400 of FIG. 11 may be, for example, an image processing device such as a digital picture recorder, a digital video recorder, a black box, a digital camera, a wireless phone including a digital camera, a mobile phone or a smart phone. However, the semiconductor device 400 is not limited thereto.

Figure 12:
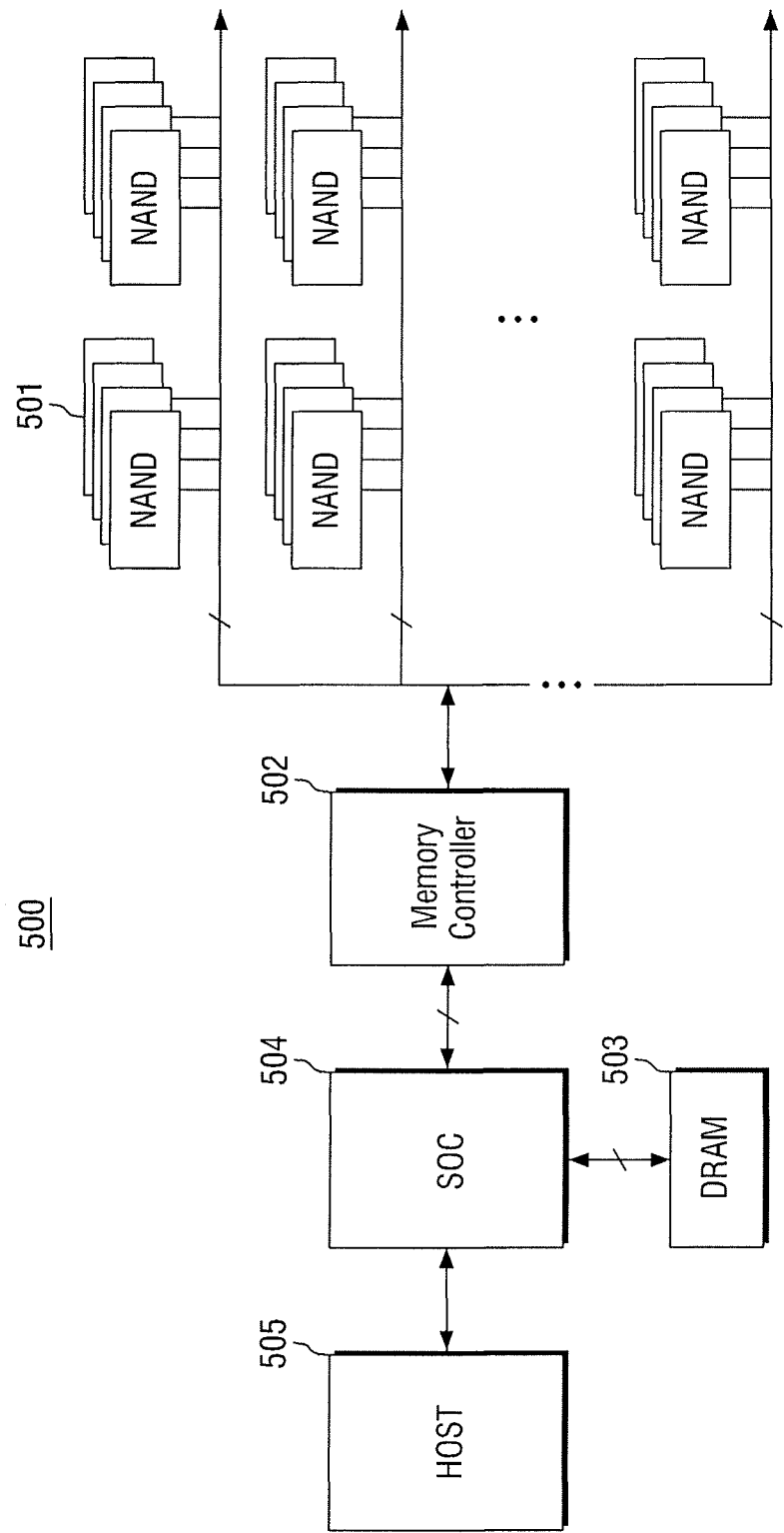
FIG. 12 is a diagram illustrating an example of a semiconductor system including multi-bus systems according to exemplary embodiments of the present invention.

FIG. 12 is a diagram illustrating an example of a semiconductor system including multi-bus systems according to exemplary embodiments of the present invention.

Referring to FIG. 12, a semiconductor system 500 includes a plurality of nonvolatile memories 501, a memory controller 502, a volatile memory 503, a SoC 504, and a host 505.

The nonvolatile memories 501 may be, for example, NAND flash memories, and the volatile memory 503 may be, for example, a DRAM. However, the nonvolatile memories 501 and the volatile memory 503 are not limited thereto.

The SoC 504 may write data received from the host 505 to the memory devices 501 through the memory controller 502, or transmit data stored in the memory devices 501 to the host 505. The SoC 504 may also store data exchanged between the memory controller 502 and the host 505 in the volatile memory 503. The multi-bus systems 1 through 6 according to exemplary embodiments of the present invention may be provided as one of various components that constitute the SoC 504.

The semiconductor system 500 of FIG. 12 may be applied to a storage device such as, for example, a solid-state device (SSD).

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A multi-bus system, comprising:
a first layer bus;
a second layer bus connected to the first layer bus;
at least one master device configured to be connected to the first layer bus via a first data path, and configured to be connected to the second layer bus via a second data path;
a decoder configured to directly connect the at least one master device to the first layer bus via the first data path, and directly connect the at least one master device to the second layer bus via the second data path; and
a third layer bus disposed between the first layer bus and the second layer bus, and connected to the first layer bus and the second layer bus,
wherein the at least one master device is configured to be connected to the third layer bus via a third data path, and the decoder is configured to connect the at least one master device to one of the first layer bus, the second layer bus, and the third layer bus,
wherein a priority of the at least one master device is managed by an arbiter of the first layer bus, an arbiter of the second layer bus, and an arbiter of the third layer bus in a first section of the multi-bus system,
wherein the priority of the at least one master device is managed only by the arbiter of the first layer bus and the arbiter of the third layer bus in a second section of the multi-bus system.

2. The multi-bus system of claim 1, wherein the priority of the at least one master device is managed only by the arbiter of the first layer bus in the first section of the multi-bus system, and is managed by both the arbiter of the first layer bus and the arbiter of the second layer bus in the second section of the multi-bus system.

3. The multi-bus system of claim 1, wherein the decoder is disposed between the first layer bus and the at least one master device, and between the second layer bus and the at least one master device.

4. A multi-bus system, further comprising:
a first layer bus;
a second layer bus connected to the first layer bus;
at least one master device configured to be connected to the first layer bus via a first data path, and configured to be connected to the second layer bus via a second data path;
a decoder configured to directly connect the at least one master device to the first layer bus via the first data path, and directly connect the at least one master device to the second layer bus via the second data path; and
a monitoring device configured to measure the amount of use of the at least one master device, and transmit a selection signal to the decoder for selecting one of the first layer bus and the second layer bus based on the measured amount of use of the at least one master device,
wherein the decoder is configured to connect the at least one master device to one of the first layer bus and the second layer bus according to an amount of use of the at least one master device.

5. The multi-bus system of claim 4, further comprising a bus bridge disposed between the second layer bus and the decoder, and configured to convert data of a first data protocol to data of a second data protocol, wherein the first data protocol is different from the second data protocol.

6. The multi-bus system of claim 5, wherein the first layer bus is configured to operate according to the first data protocol, and the second layer bus is configured to operate according to the second data protocol.

7. A multi-bus system, comprising:
a first layer bus;
a second layer bus connected to the first layer bus;
at least one master device configured to be connected to the first layer bus and the second layer bus;
a decoder configured to directly connect the at least one master device to the first layer bus, and directly connect the at least one master device to the second layer bus, and connect the at least one master device to the first layer bus via the second layer bus; and
a monitoring device configured to measure an amount of use of the at least one master device, and transmit a selection signal to the decoder for selecting one of the first layer bus and the second layer bus based on the measured amount of use of the at least one master device.

8. The multi-bus system of claim 7, further comprising:

a first layer bus arbiter connected to the first layer bus; and a second layer bus arbiter connected to the second layer bus, wherein a priority of the at least one master device is managed only by the first layer bus arbiter while the at least one master device is connected directly to the first layer bus by the decoder, wherein the priority of the at least one master device is managed only by the second layer bus arbiter while the at least one master device is connected directly to the second layer bus by the decoder, wherein the priority of the at least one master device is managed by both the first layer bus arbiter and the second layer bus arbiter while the at least one master device is connected to the first layer bus via the second layer bus by the decoder.

9. The multi-bus system of claim 8, wherein the decoder is configured to connect the at least one master device to one of the first layer bus and the second layer bus according to the amount of use of the at least one master device.

10. The multi-bus system of claim 7, further comprising a bus bridge disposed between the second layer bus and the decoder, and configured to convert data of a first data protocol to data of a second data protocol, wherein the first data protocol is different from the second data protocol.

\* \* \* \* \*